United States Defensive Publication [19] (H) [11] T973,002

Klett [43] Aug. 1, 1978

[54] REPLACEABLE CORNER CUTTING EDGE

[75] Inventor: Gene R. Klett, Joliet, Ill.

[73] Assignee: Caterpillar Tractor Co., Peoria, Ill.

[21] Appl. No.: 863,485

[22] Filed: Dec. 22, 1977

[51] Int. Cl.[2] ..... E02F 9/28

[52] U.S. Cl. ..... 37/142 R

[57] ABSTRACT

A replaceable cutting edge includes a substantially horizontal bottom plate having an upright opening therethrough, a side wall and a tapered front edge, and a substantially vertical side plate integrally secured to the bottom plate adjacent the side wall. The side plate has upwardly converging front and rear surfaces forming an apex and a substantially horizontal opening through the apex. The cutting edge is positioned protectively over the corner of an implement such as a loader bucket, and is positively secured thereat through bolts through the openings.

6 Claims, 2 Sheets Drawing,

7 Pages Specification

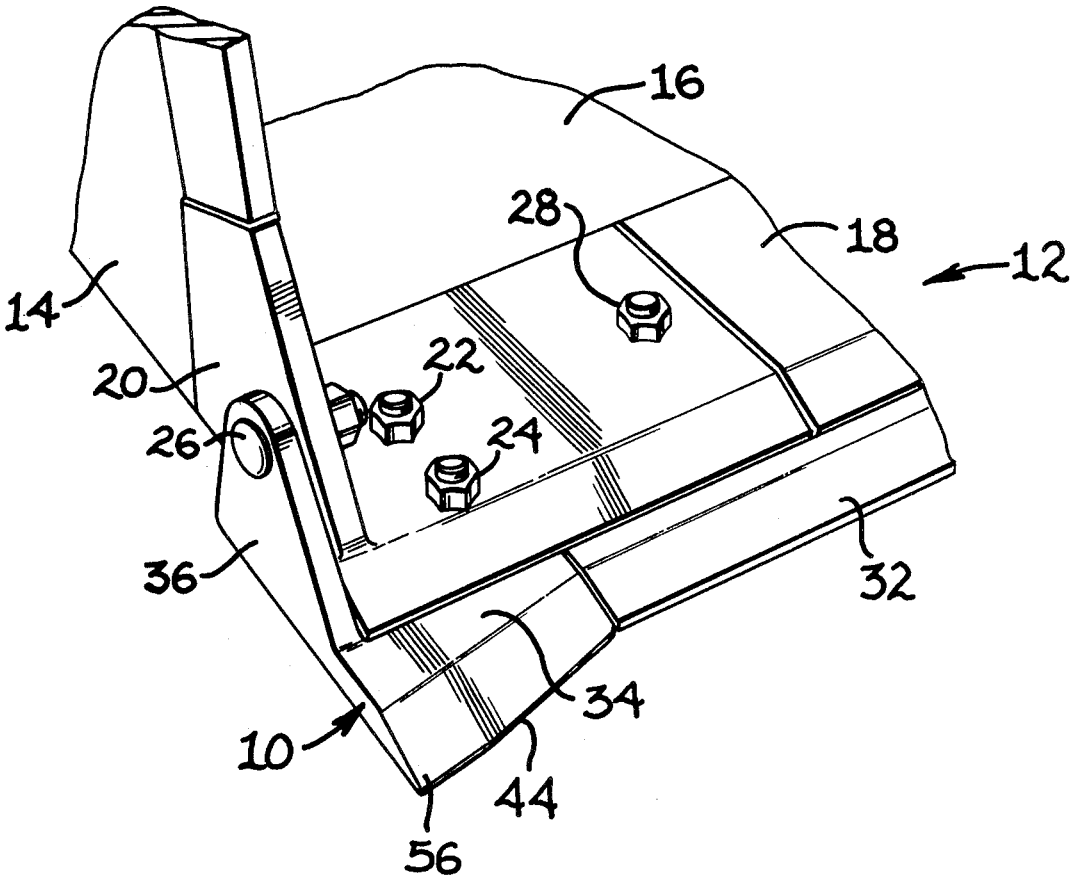

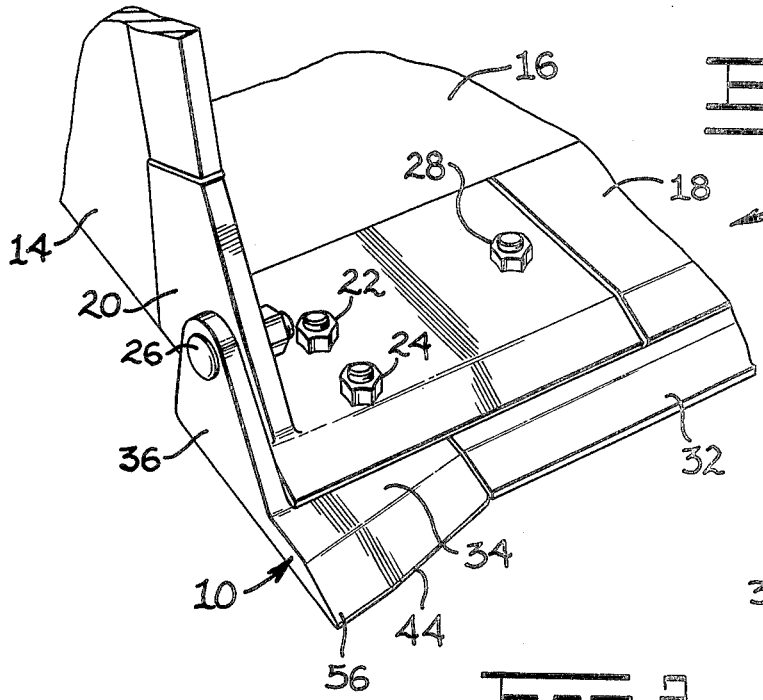
Fig. 1.
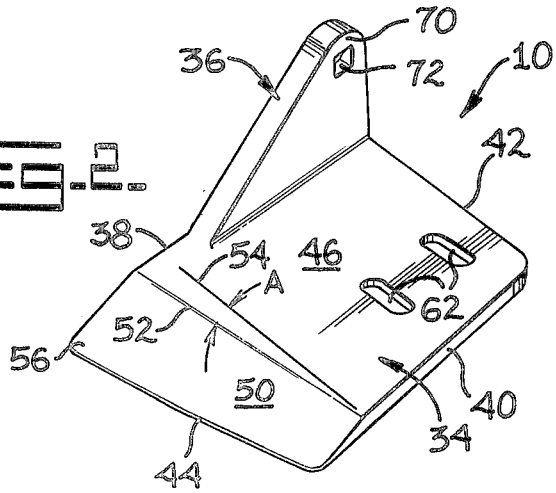
Fig. 2.
Fig. 3.
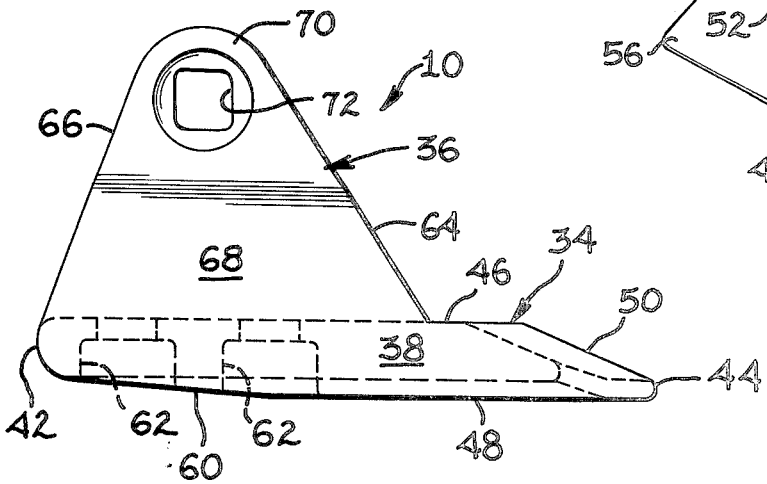
Fig. 4.
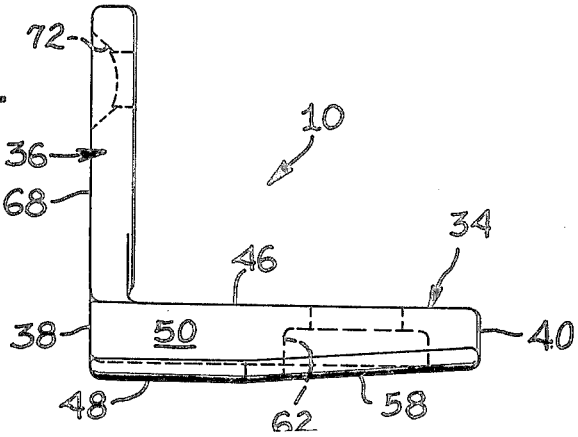

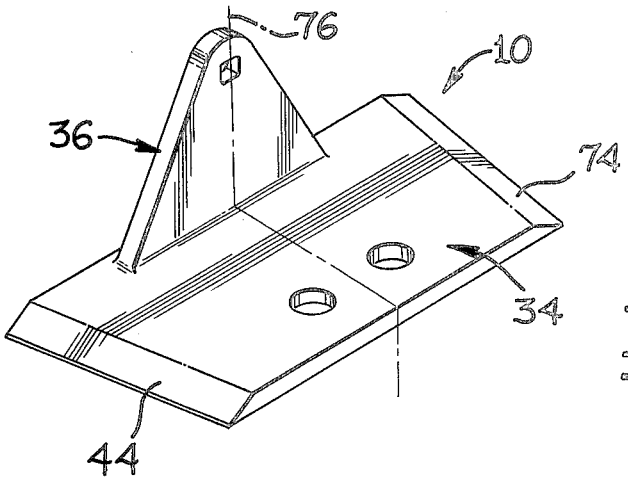
Fig. 5.
Fig. 6.
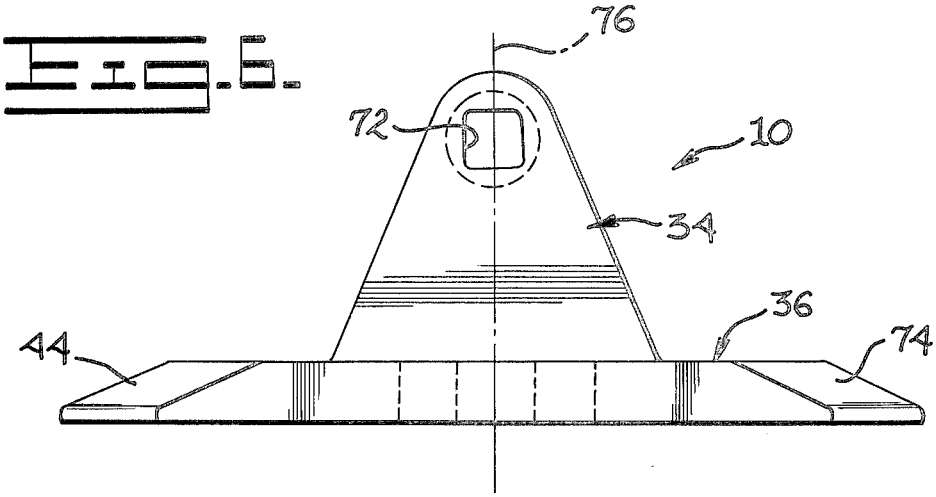
Fig. 7.
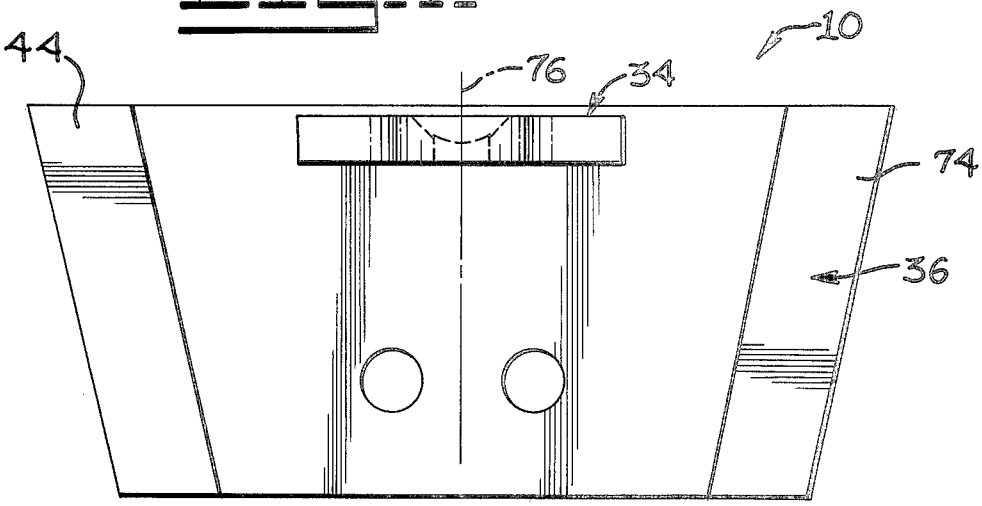

The file of this unexamined application may be inspected and copies thereof may be purchased (849 O.G. 1221, Apr. 9, 1968).